March 26, 1968 R. OHLHORST 3,375,398

MULTI-BEAM CONVERGENCE SYSTEM

Filed Sept. 9, 1964 2 Sheets-Sheet 1

Jnventor:
Rolf Ohlhorst
by Michael J. Striker
Atty

March 26, 1968 R. OHLHORST 3,375,398

MULTI-BEAM CONVERGENCE SYSTEM

Filed Sept. 9, 1964

2 Sheets-Sheet 2

Inventor:
Rolf Ohlhorst
by Michael S. Striker

United States Patent Office 3,375,398
Patented Mar. 26, 1968

3,375,398

MULTI-BEAM CONVERGENCE SYSTEM

Rolf Ohlhorst, Hildesheim, Germany, assignor to Blaupunkt-Werke, GmbH, Hildesheim, Germany Filed Sept. 9, 1964, Ser. No. 395,232
Claims priority, application Germany, Sept. 18, 1963, B 73,551
20 Claims. (Cl. 315—13)

ABSTRACT OF THE DISCLOSURE

An apparatus for allowing separate, independent convergence adjustments for each edge of the picture frame of a color television receiver. A second correction current derived from the respective deflection circuits is superimposed on the first parabolic correction current in each of the correction magnet coils, such that the second current affects the first current only during one-half of the frame or line deflection, and is zero during the other half of the frame or line deflection.

The present invention relates to a television receiver which is equipped with a convergence circuit for use with a tri-gun color picture tube, in which the correction is effected by means of three separate color correcting magnets, these including the so-called convergence pole pieces having coils positioned between the deflection system and the cathode, in accordance with the distribution of the three cathode ray beams. As is conventional in such convergence systems—known as dynamic convergence—the current passed through the converging coils during the scan is approximately parabolic, and the amplitude of the current can be adjusted as needed.

Television receivers of the above type use tubes whose screens have three different color-emitting phosphors, which screen is subjected to the action of three separate beams produced by the three respective cathodes. In order to insure that each beam strikes only one type of phosphor dot, a mask, the so-called shadow mask, is positioned between the electron guns and the phosphor dot screen, the mask being so arranged in front of and parallel to the screen that each of the circular holes in the mask—the number of holes in the mask being equal to the number of dot trios, with each trio including a phosphor dot for producing each of the three colors—is so aligned with respect to its trio that any one of the approaching beams can strike only its corresponding phosphor dot. However, the three electron guns do not lie in the center axis of the tube as a result of which the three electron beams are deflected to different extents by the magnetic deflection system, so that the beams have to be corrected or "converged" in order to obtain a good picture. More particularly, in order to maintain the converged condition of the beams as they swing away from the center of the screen, their relative angles have to be varied. This changing of the beam angle in synchronism with the scanning, conventionally referred to as dynamic balancing, is needed because the distance travelled by the beams increases as they swing away from the center of the screen. The swing away from the center occurs because the curvature of the screen is not perfectly spherical, and beams which are converged at the center of the screen will tend to converge in front of the shadow mask at points away from the center. This is conventionally done by providing separate deflection fields for each of the three beams, these separate deflection fields being effective near the system for producing the three cathode beam correction deflection fields. In practice, the correction voltages needed to accomplish this are derived from the vertical and horizontal deflection systems, these voltages being, as stated above, generally parabolic such that when the three beams are in the center of the screen the correction current is zero, while, on either side of the center, the current varies and the combined effect of the dynamic and static fields is to keep the beams properly converged at each point of the screen.

Experience has shown that the circuits for maintaining the convergence have to be adjusted very carefully so that the amplitude and wave shape of the correcting current will remain within the required limits. A serious drawback of such circuits is that when an adjustment is made to meet one of the requirements needed to obtain proper convergence, other and prior adjustments made to meet other requirements are insufficient in one way or another and therefore require re-adjustment. That is to say, the various adjustments that have to be made have a mutual effect on each other so that the total time required for making all of the necessary adjustments, i.e., the time needed properly to adjust the receiver as a whole, is very high.

It is, therefore, the primary object of the present invention to provide a multiple gun color picture tube in which the adjustment of the convergence at one edge portion of the picture screen does not adversely affect a previously made adjustment for another edge portion of the screen, and this, in accordance with the present invention, is accomplished by superimposing on the parabolic currents a second correcting current which is likewise adjustable, which second current influence is the parabolic current only during one half of the parabola, the second correcting current being at least approximately zero during the other half of the parabola. As a result, any change in the additional correcting current will influence only one edge portion of the screen.

More particularly, the present invention resides in a color television receiver which comprises a tri-gun color picture tube having three cathodes and a deflection system, three separate convergence magnets each having a convergence coil positioned between a respective one of the cathodes and the deflection system, first adjustable means connected to the convergence coils for feeding therethrough parabolic correction currents during scan, and second adjustable means connected to the convergence coils for feeding therethrough second correction currents, superimposed on the parabolic correction currents for varying the amplitude thereof, only during the time when one half of the parabola of the parabolic currents flows through the respective convergence coils, the second correction currents being at least approximately zero during the other half of the parabola of the parabolic currents. As a result, an adjustment effected by the second adjustable means is effective substantially exclusively in but one edge portion of the screen of the picture tube.

The novel features which are considered as characteristic for the invention are set forth in particular in the appended claims. The invention itself, however, both as to its construction and its method of operation, together with additional objects and advantages thereof, will be best understood from the following description of specific embodiments when read in conjunction with the accompanying drawings, in which:

Figure 1:
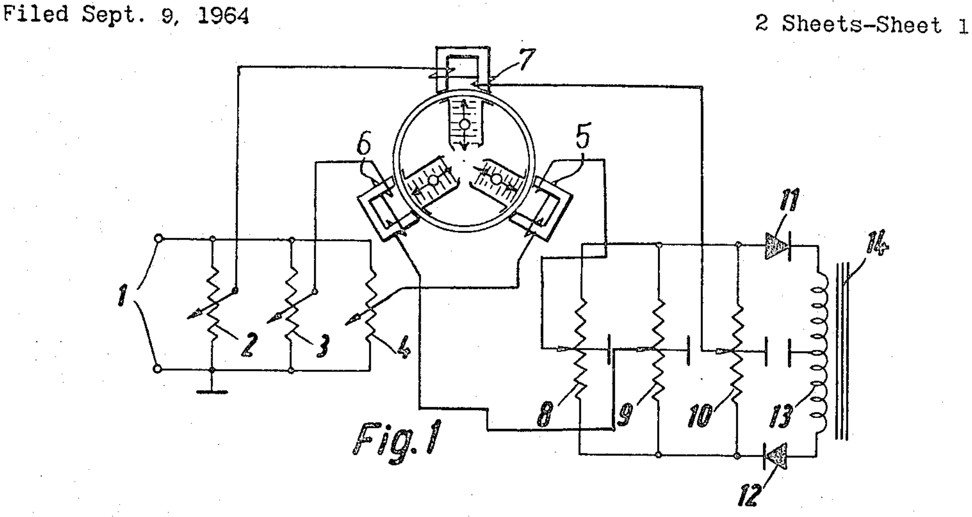
FIGURE 1 is a circuit diagram of one embodiment of a convergence circuit according to the present invention.

Referring now to the drawings and to FIGURE 1 thereof in particular, the same shows three potentiometers 2, 3, 4, connected in parallel across a current source 1, the movable contacts, or so-called slides, of the three potentiometers 2, 3, 4, being connected to the three converging coils 7, 6, 5, respectively. These three coils serve as the convergence coils for the three basic colors conventionally used in a tri-gun television tube, namely, blue, red and green. The other ends of the coils 5, 6, 7, are connected, respectively, to the slides of three further potentiometers 8, 9, 10, which are connected, via two oppositely poled diodes 11 and 12, across a take-off winding 13 of the picture deflection transformer 14. The potentiometers 8, 9, 10, as well as winding 13, are provided with grounded center taps.

The amplitude of the parabolic correcting currents 15 (see the wave form depicted in FIGURE 2), which are derived from the source 1 and sent through the coils 5, 6, 7, is adjusted by means of the potentiometers 2, 3, 4, these currents flowing to ground through the center taps of the potentiometers 8, 9, 10, and the winding 13. A second current, whose amplitude depends on the position of the slides of the potentiometers 8, 9, 10, will flow from a portion of the winding 13 of the deflection transformer 14, via the electronic switching means constituted by either of the two diodes 11, 12, through the convergence coils, which second current will be superimposed on the already-described parabolic current.

Figure 2:
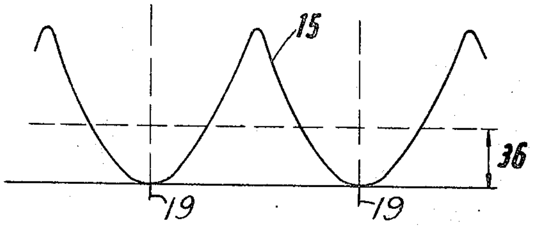
FIGURE 2 shows the wave shape of the parabolic correcting current.
Figure 3:
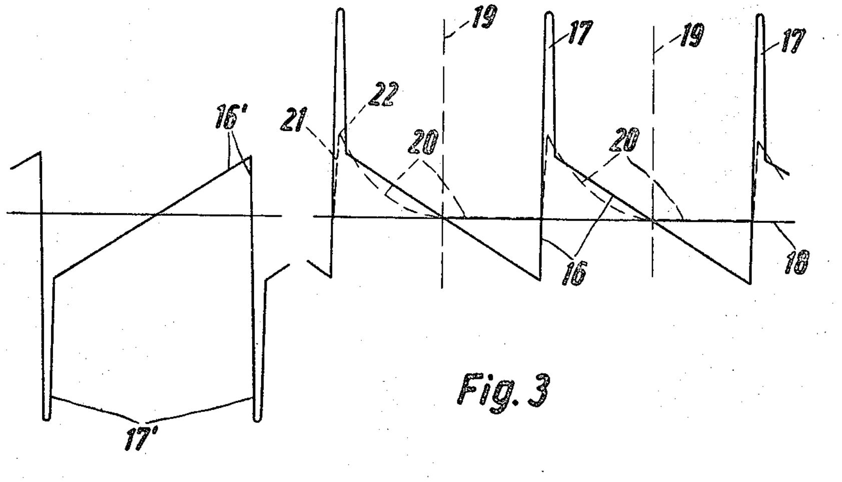
FIGURE 3 shows the wave shape of an additional correcting current provided in accordance with the present invention.

The wave shape of the voltage across the winding 13 is generally saw tooth, as shown in FIGURE 3 at 16, the basic wave shape having superimposed on it the flyback pulses 17. The polarity of the diodes 11 and 12 is such that they pass only that portion of the saw tooth current which lies above the middle of the saw tooth and which contains the flyback pulse, i.e., diode 11 passes a negative pulse voltage 16′ (see left-hand portion of FIGURE 3) containing the negative flyback pulse 17′ while the diode 12 passes a positive pulse voltage 16 containing the positive flyback pulse 17, which portion becomes zero after the electron beam has reached the center of the picture screen, shown at 19. At this point the parabolic correction current 15, shown in FIGURE 2, is equal to zero. There will thus flow through the coils 5, 6, 7, besides the first, parabolic current 15, a second current 20 which can be adjusted by the settings of the potentiometers 8, 9, 10. Due to the series resistance and the inductance of the coils 5, 6 or 7, this second current 20 will have a large amplitude in the region of the edge portion of the picture screen, produced as the result of pulses each having a steep rising flask as depicted in FIGURE 3. Each pulse then bends abruptly to form a knee 22, whereafter the trailing flank of the pulse drops parabolically, i.e., steeply at first and then more gradually, to the zero line 18. In the case of low voltages, the larger resistance of the diodes 11, 12, will cause each pulse of the current 20 to reach zero at a point ahead of the instant at which the beam reaches the center of the screen, at 19, i.e., just prior to the middle of the scanning period.

Figure 4:
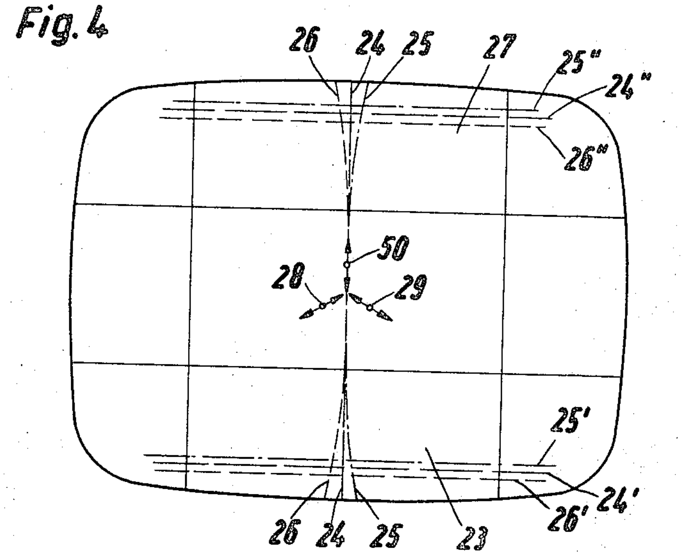
FIGURE 4 is a front view of a television picture tube screen and shows horizontal and vertical lines to be converged.

The convergence system for the central portion of the screen is adjusted conventionally, i.e., the adjustment is in the nature of so-called static convergence in which the positions of the beams are adjusted using either fixed D.C. voltages or fixed magnetic fields, depending on the type of gun. For example, static convergence may be obtained by means of four permanent magnets which are arranged in the vicinity of the convergence magnets or which are combined therewith. While in conventional receivers, the convergences at the edges of the screen are first adjusted coarsely by changing the amplitudes of the parabolic currents, the convergence of a receiver in accordance with the present invention can be immediately adjusted to its final position by following the proper sequence of steps as follows, reference being had to FIGURE 4.

First, the lines of the individual electron beams for "blue" (24), "red" (25) and "green" (26), depicted as being vertical lines thereby to form the raster, are brought into alignment with each other in the lower edge portion 23 of the screen of the picture tube (the term "edge portion" being intended, throughout the instant specification and claims, to refer to a region of the screen other than the central portion thereof, i.e., to an off-center region) by adjusting the settings of the potentiometers 2, 3, 4, the same preferably being steplessly, i.e., infinitely, variable. This will, in general, also align the three lines in the upper edge portion 27 of the screen, although the lines will not be finally and completely aligned there as yet. The alignment in edge portion 27 is then finalized by adjusting the settings of the potentiometers 8, 9, 10.

It will be appreciated that the adjustment of the potentiometers 8, 9, 10, will have no significant effect on the adjustment already effected in the lower edge portion 23 inasmuch as, during the time the beams sweep the upper edge portion 27, the second correcting current 20 is zero (see FIGURE 3), and because the resistance of the potentiometers 2, 3, 4, as well as the resistances of those portions of the potentiometers 8, 9, 10, through which the parabolic current flows, will be low as compared to the resistance of the coils 5, 6, 7.

Figure 5:
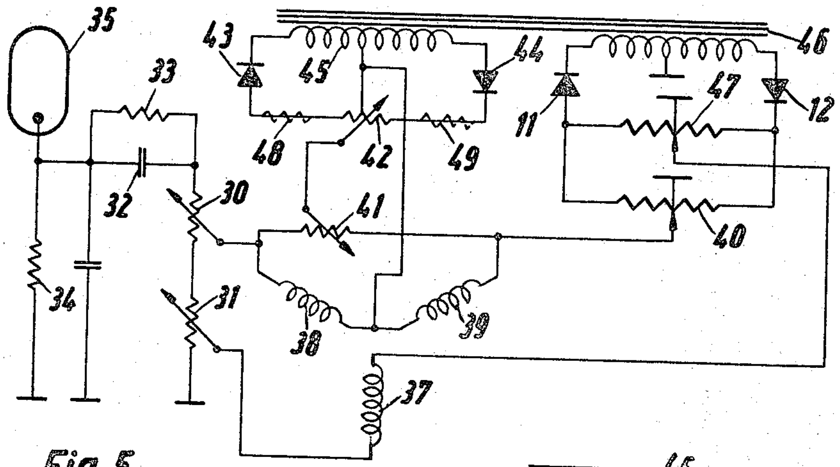
FIGURE 5 is a circuit diagram of another embodiment of a convergence circuit according to the present invention.

Since, however, the convergence coils will deflect two of the electron beams (identified at 28 and 29 in FIGURE 4) approximately diagonally and simultaneously, the individual horizontal lines 24′, 25′ and 26′ will generally not be made to converge when the vertical lines 25, 26, are brought into registration. Accordingly, horizontal color lines will not be in alignment with each other in the portions 23 and 27 of the screen. This can be compensated for by means of a further feature of the present invention, the same being constituted by the provision of means which supply yet another, i.e., a third, correcting current which likewise has no effect on the previously made adjustments. Such means are shown in FIGURE 5 in which the parabolic correcting currents are taken from the slides of two serially-connected potentiometers 30 and 31 which are connected, via an RC-element comprising the capacitor 32 and the resistor 33, to the cathode resistance 34 of the deflection tube 35. The capacitor 32 passes A.C., while the resistance of resistor 33 is such that it applies a D.C. component 36 (see FIGURE 2) as a result of which the parabolic current 15 becomes zero in the center of the screen (see 19 in FIGURE 3). As a result, the convergence adjustment effected by means of this current will not influence the convergence in the center of the screen.

The coil 37—this being the coil associated with the "blue" beam—is connected the same way as the corresponding coil in FIGURE 1, i.e., to the slide of a potentiometer 47 which itself is connected, via diodes 11, 12, across a winding of the deflection transformer 46. However, the coils 38 and 39, being the "red" and "green" convergence coils, respectively, are connected in series and have but one current circuit associated therewith, through which flows the second correction current which, in the instant embodiment, is derived from a potentiometer 40, the same thus being the counterpart of the potentiometers 9, 10, of the embodiment of FIGURE 1. A further potentiometer 41 is connected across the series-connection of the two coils 38, 39, the slide of this potentiometer 41 being connected with the slide of still another potentiometer 42 whose terminals are connected, via oppositely poled diodes 43, 44, across an additional winding 45 of the deflection transformer 46. The winding 45 is provided with a center tap which is connected with the junction of the coils 38, 39, and with the center tap of potentiometer 42.

The convergence is adjusted in a manner similar to that described above, in that the vertical red and green lines 25, 26, are brought into alignment, in the edge portion 23 of the screen, by adjusting the setting of potentiometer 30. The vertical red and green lines 25, 26, are next aligned in the edge portion 27 by adjusting the setting of potentiometer 40. The distribution of the correction currents can be varied by adjusting the potentiometer 41 so that, depending on the position of the potentiometer 41, either the coil 38 or the coil 39 will, alternatively, have a greater or lesser resistance connected in parallel with itself. Here, the resistances of the potentiometer 42, the diodes 43, 44, and the winding 45 are of secondary importance inasmuch as their resistances will be less than the resistances of coils 38, 39. By selecting proper resistance values, the currents will vary such that, with adjustment of the potentiometer 41, the vertical red and green lines 25, 26, will to a large extent remain aligned, while the individual color dots, however, will be shifted vertically on the thus formed line. In this way, the horizontally depicted red and green lines 25', 26', can be brought into alignment within the edge portion 23 of the screen, while the horizontal red and green lines 25'', 26'', are aligned, in the edge portion 27, by adjusting the setting of the potentiometer 42.

In this way, the third correction current is derived from the potentiometer 42 which, being connected to a further take-off winding 45 via the diodes 43, 44, thus constitutes a current source that is essentially similar to the current source from which the second correction current is derived. The wave shape of this third correction current is thus similar to that of the second correction current. Adjusting the potentiometer 42 will not disturb the setting for the other correction currents inasmuch as the resistance of the circuit being used changes but little.

In order to reduce even further any effect which the adjustment of the potentiometer 42 may still have on the other settings, the range throughout which the potentiometer 42 is effective can be narrowed by means of additional resistors 48, 49, connected between the terminals of the potentiometer and the respective diodes 43, 44. These additional resistors 48, 49, can be used provided the maximum correction which is to be effected by the third current, under the control of the potentiometer 42, is small as compared to the correction to be effected by the other correction or convergence means, i.e., provided the third correction current is small as compared to the other correction currents.

After the vertical convergence for the "red" and "green" cathode beams 28, 29, have been adjusted, there still remains the "blue" cathode beam 50 to be adjusted, this being the beam which the converging magnet deflects in vertical direction only. First, a blue horizontal raster line 24' is brought into alignment with the red-green horizontal raster line in the edge portion 23 by adjusting the setting of potentiometer 31, after which a similar adjustment is effected in the upper edge portion 27 by means of the potentiometer 47.

Figure 6:
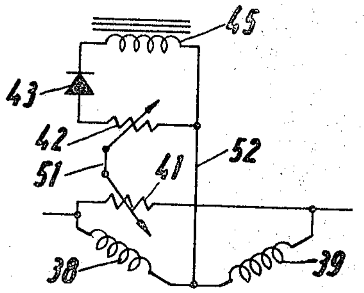
FIGURE 6 is a circuit diagram of a portion of the circuit of FIGURE 5, and shows a simplified arrangement of such portion.

The circuitry can be simplified by so arranging the picture tube, the deflection system and/or the converging system, or by selecting such a wave shape for the correction currents, especially the parabolic correction current, that at least one of the correction currents, particularly the third correction current, need be of but one polarity. This, as shown in FIGURE 6, eliminates one of the diodes, e.g., diode 44, as well as half of the winding 45. In that case, the connections 51, 52, may, if desired, be so fashioned as to be readily interchangeable, e.g., they can be constituted by plug-type connectors or they can be so arranged as to lend themselves to ready re-soldering. In this way, the polarity of the third correction current can, if necessary, be changed.

It will be understood that each of the elements described above, or two or more together, may also find useful application in other types of multiple gun picture tubes differing from the types described above.

While the invention has been illustrated and described as an embodiment in a three-color, or so-called tri-gun picture tube, it is not intended to be limited to the details shown, since various modifications and structural changes may be made without departing in any way from the spirit of the present invention.

Without further analysis, the foregoing will so fully reveal the gist of the present invention that others can by applying the current knowledge readily adapt it for various applications without omitting features that, from the standpoint of the prior art, fairly constitute essential characteristics of the generic or specific aspects of this invention and, therefore, such adaptations should and are intended to be comprehended within the meaning and range of equivalents of the following claims.

What is claimed is:

1. A color television receiver comprising, in combination a tri-gun color picture tube having three cathodes and a deflection system; three separate convergence magnets each having a convergence coil positioned between a respective one of said cathodes and said deflection system; first adjustable means connected to said convergence coils for feeding parabolic correction currents through said convergence coils during scan; and second adjustable means connected to said convergence coils for feeding through said convergence coils second correction currents, superimposed on said parabolic correction currents for varying the amplitude thereof, only during the time when one half of the parabola of said parabolic currents flows through the respective convergence coils, said second correction currents being at least approximately zero during the other half of the parabola of said parabolic currents, whereby an adjustment effected by said second adjustable means is effective substantially exclusive in but one edge portion of the screen of the picture tube.

2. A color television receiver comprising, in combination, a tri-gun color picture tube having three cathodes and a deflection system; three separate convergence magnets each having a convergence coil positioned between a respective one of said cathodes and said deflection system; first adjustable means connected to said convergence coils for feeding parabolic correction currents through said convergence coils during scan; and second adjustable means connected to said convergence coils for feeding through said convergence coils second correction currents, superimposed on said parabolic correction currents for varying the amplitude thereof, only during the time when one half of the parabola of said parabolic currents flows through the respective convergence coils, said second correction currents being at least approximately zero during the other half of the parabola of said parabolic currents, whereby an adjustment effected by said second adjustable means is effective substantially exclusively in but one edge portion of the screen of the picture tube, said second adjustable means comprising a source for producing a saw tooth voltage, and switching means in circuit with said source for passing only one half of the saw tooth voltage.

3. A color television receiver as defined in claim 2 wherein said switching means comprise diode means.

4. A color television receiver comprising, in combination, a tri-gun color picture tube having three cathodes and a deflection system; three separate convergence magnets each having a convergence coil positioned between a respective one of said cathodes and said deflection system; first adjustable means connected to said convergence coils for feeding parabolic correction currents through said convergence coils during scan; and second adjustable means connected to said convergence coils for feeding through said convergence coils second correction currents, superimposed on said parabolic correction currents for varying the amplitude thereof, only during the time when one half of the parabola of said parabolic currents flows through the respective convergence coils, said second correction currents being at least approximately zero during the other half of the parabola of said parabolic currents, whereby an adjustment effected by said second adjustable means is effective substantially exclusively in but one edge portion of the screen of the picture tube, said second adjustable means comprising a source for producing a saw tooth voltage, said source being constituted by a deflection stage across which appears said saw tooth voltage, the same having a flyback pulse superimposed thereon, and switching means in circuit with said deflection stage for passing only that half of said saw tooth voltage which has said superimposed flyback pulse.

5. A color television receiver as defined in claim 4 wherein said second correction current is constituted by current pulses each of which has a steep rising flank, occurs during the flyback of the electron beam, and has a trailing flank which drops steeply at the beginning of a scanning period and thereafter drops more gradually, each pulse reaching zero prior to the middle of the respective scanning period.

6. A color television receiver comprising, in combination a tri-gun color picture tube having three cathodes and a deflection system; three separate convergence magnets each having a convergence coil connected between a respective one of said cathodes and said deflection system; first adjustable means connected to said convergence coils for feeding parabolic correction currents through said convergence coils during scan; second adjustable means connected to said convergence coils for feeding through said convergence coils second correction currents, superimposed on said parabolic correction currents for varying the amplitude thereof, only during the time when one half of the parabola of said parabolic currents flows through the respective convergence coils, said second correction currents being at least approximately zero during the other half of the parabola of said parabolic currents, whereby an adjustment effected by said second adjustable means is effective substantially exclusively in but one edge portion of the screen of the picture tube; and means for maintaining the current minima of said parabolic correction currents constant in the middle of the scanning periods.

7. A color television tube as defined in claim 6 wherein said minima are at least approximately equal to zero.

8. A color television receiver comprising, in combination a tri-gun color picture tube having three cathodes and a deflection system; three separate convergence magnets each having a convergence coil connected between a respective one of said cathodes and said deflection system; first adjustable means connected to said convergence coils for feeding parabolic correction currents through said convergence coils during scan; and second adjustable means connected to said convergence coils for feeding through said convergence coils second correction currents, superimposed on said parabolic correction currents for varying the amplitude thereof, only during the time when one half of the parabola of said parabolic currents flows through the respective convergence coils, said second correction currents being at least approximately zero during the other half of the parabola of said parabolic currents, whereby an adjustment effected by said second adjustable means is effective substantially exclusively in but one edge portion of the screen of the picture tube; said first and second adjustable means being constructed and arranged such that adjustment for each of said correction currents avoids adverse changes in the other of said currents.

9. A color television receiver comprising, in combination a tri-gun color picture tube having three cathodes and a deflection system; three separate convergence magnets each having a convergence coil connected between a respective one of said cathodes and said deflection system; first adjustable means connected to said convergence coils for feeding parabolic correction currents through said convergence coils during scan; and second adjustable means connected to said convergence coils for feeding through said convergence coils second correction currents, superimposed on said parabolic correction currents for varying the amplitude thereof, only during the time when one half of the parabola of said parabolic currents flows through the respective convergence coils, said second correction currents being at least approximately zero during the other half of the parabola of said parabolic currents, whereby an adjustment effected by said second adjustable means is effective substantially exclusively in but one edge portion of the screen of the picture tube; each of said first and second adjustable means including means for varying both the amplitude and polarity of the respective correction currents, the adjustments effected by each of said adjustable means being infinitely variable.

10. A color television receiver comprising, in combination a tri-gun color picture tube having three cathodes and a deflection system; three separate convergence magnets each having a convergence coil connected between a respective one of said cathodes and said deflection system; first adjustable means connected to said convergence coils for feeding parabolic correction currents through said convergence coils during scan; and second adjustable means connected to said convergence coils for feeding through said convergence coils second correction currents, superimposed on said parabolic correction currents for varying the amplitude thereof, only during the time when one half of the parabola of said parabolic currents flows through the respective convergence coils, said second correction currents being at least approximately zero during the other half of the parabola of said parabolic currents, whereby an adjustment effected by said second adjustable means is effective substantially exclusively in but one edge portion of the screen of the picture tube, said second adjustable means including a deflection transformer having a take-off winding provided with a grounded center tap, a potentiometer having two ends connected, via opposite poled diodes, across said take-off winding, said potentiometer having a slide connected to one terminal of a respective one of said convergence coils, the other terminal of the convergence coil being connected to said first adjustable means, the same including a grounded current source for producing said parabolic correction current.

11. A color television receiver comprising, in combination a tri-gun color picture tube having three cathodes and a deflection system; three separate convergence magnets each having a convergence coil connected between a respective one of said cathodes and said deflection system; first adjustable means connected to said convergence coils for feeding parabolic correction currents through said convergence coils during scan; and second adjustable means connected to said convergence coils for feeding through said convergence coils second correction currents, superimposed on said parabolic correction currents for varying the amplitude thereof, only during the time when one half of the parabola of said parabolic currents flows through the respective convergence coils, said second correction currents being at least approximately zero during the other half of the parabola of said parabolic currents, whereby an adjustment effected by said second adjustable means is effective substantially exclusively in but one edge portion of the screen of the picture tube, said second adjustable means including a deflection transformer having a take-off winding provided wtih a grounded center tap, three parallely connected potentiometers each having its two ends connected, via oppositely poled diodes, across said take-off winding, each of said potentiometers having a slide connected to one terminal of a respective one of said three convergence coils, the other terminal of each convergence coil being connected to said first adjustable means, the same including a grounded current source for producing said parabolic correction current.

12. A color television receiver comprising, in combination, a tri-gun color picture tube having three cathodes and a deflection system; three separate convergence magnets each having a convergence coil connected between a respective one of said cathodes and said deflection system, two of said convergence coils being connected in series with each other; first adjustable means connected to said convergence coils for feeding parabolic correction currents through said convergence coils during scan; and second adjustable means connected to said convergence coils for feeding through said convergence coils second correction currents, superimposed on said parabolic correction currents for varying the amplitude thereof, only during the time when one half of the parabola of said parabolic currents flows through the respective convergence coils, said second correction currents being at least approximately zero during the other half of the parabola of said parabolic currents, whereby an adjustment effected by said second adjustable means is effective substantially exclusively in but one edge portion of the screen of the picture tube, said second adjustable means including a deflection transformer having a take-off winding provided with a grounded center tap, two parallely connected potentiometers each having its two ends connected, via opposite poled diodes, across said take-off winding, one of said potentiometers having a slide connected to one terminal of the series-circuit formed by said two serially-connected convergence coils and the other of said potentiometers having a slide connected to one terminal of the third convergence coil, the other terminal of said series-circuit and the other terminal of said third convergence coil being connected to said first adjustable means, the same including a grounded current source for producing said parabolic correction currents.

13. A color television receiver as defined in claim 12, further comprising third adjustable means for feeding a third correction current through said two serially-connected convergence coils.

14. A color television receiver as defined in claim 13, wherein said third adjustable means comprise a further potentiometer which has a slide and which is connected across said series-circuit, and a current source connected across said slide of said last-mentioned potentiometer and the juncture of said two serially-connected convergence coils.

15. A color television receiver as defined in claim 14, wherein said current source comprises a further take-off winding of said deflection transformer, said further take-off winding having a grounded center tap, and a still further potentiometer which has its two ends connected via further opposite poled diodes across said further take-off winding, said last-mentioned potentiometer having a slide connected to said slide of said potentiometer which is connected across said series-circuit.

16. A color television receiver as defined in claim 13, wherein said third correction current has the same wave shape as said second correction current.

17. A color television receiver as defined in claim 13 wherein said third adjustable means include means for varying both the amplitude and polarity of said third correction current, the adjustment effected by said third adjustable means being infinitely variable.

18. A color television receiver as defined in claim 13 wherein said third adjustable means is constructed and arranged such that adjustment of said third correction current avoids adverse changes in the other correction currents.

19. A color television receiver as defined in claim 13 wherein said third adjustable means are connected to change only the amplitude of said third correction current.

20. A color television receiver as defined in claim 19 wherein said third adjustable means are additionally provided with readily changeable connections for enabling the polarity of said third correction current to be changed.

References Cited

UNITED STATES PATENTS

| | | | |
|---|---|---|---|
| 2,903,622 | 9/1959 | Schopp | 315—27 |
| 3,163,797 | 12/1964 | Singleback | 315—22 |
| 3,187,218 | 6/1965 | E'Del | 315—22 |
| 3,258,642 | 6/1966 | Dietz | 315—22 |
| 3,258,643 | 6/1966 | Lemke | 315—22 |

RODNEY D. BENNETT, *Primary Examiner.*

DAVID G. REDINBAUGH, *Examiner.*

T. A. GALLAGHER, M. F. HUBLER, *Assistant Examiners.*